US012409455B2

(12) United States Patent
Swaminathan et al.

(10) Patent No.: US 12,409,455 B2
(45) Date of Patent: Sep. 9, 2025

(54) ARRANGEMENT FOR ENSURING EVEN PRESSURE DISTRIBUTION FOR HYDRAULIC ROLLER PRESS

(71) Applicant: FLSmidth Cement A/S, Valby (DK)

(72) Inventors: Raghunathan Swaminathan, Chennai (IN); Nicolai Stenberg Balk Møller, Copenhagen (DK)

(73) Assignee: FLSmidth Cement A/S, Valby (DK)

( * ) Notice: Subject to any disclaimer, the term of this patent is extended or adjusted under 35 U.S.C. 154(b) by 293 days.

(21) Appl. No.: 18/033,064

(22) PCT Filed: Oct. 10, 2021

(86) PCT No.: PCT/IB2021/059692
§ 371 (c)(1),
(2) Date: Apr. 20, 2023

(87) PCT Pub. No.: WO2022/084893
PCT Pub. Date: Apr. 28, 2022

(65) Prior Publication Data

US 2023/0390783 A1 Dec. 7, 2023

(30) Foreign Application Priority Data

Oct. 20, 2020 (DK) ........................... PA 2020 01185

(51) Int. Cl.
*B02C 4/34* (2006.01)
*B02C 4/02* (2006.01)

(52) U.S. Cl.
CPC . *B02C 4/34* (2013.01); *B02C 4/02* (2013.01)

(58) Field of Classification Search
CPC .... B02C 4/00; B02C 4/02; B02C 4/30; B02C 4/32
See application file for complete search history.

(56) References Cited

U.S. PATENT DOCUMENTS 9,744,536 B2 * 8/2017 Visby-KjæRgaard .. B02C 4/283

FOREIGN PATENT DOCUMENTS

| | | | |
|---|---|---|---|
| DE | 4037816 | A1 | 6/1992 |
| EP | 2167234 | A1 | 3/2010 |
| WO | 2009013276 | A1 | 1/2009 |
| WO | 2014117783 | A1 | 8/2014 |

OTHER PUBLICATIONS

International Search Report and Written Opinion dated Feb. 2, 2022, 12 pages.

* cited by examiner

*Primary Examiner* — Matthew Katcoff
(74) *Attorney, Agent, or Firm* — Buchanan Ingersoll & Rooney PC

(57) ABSTRACT

The invention relates to a roper press for grinding of specific materials such as cement raw materials, cement clinker and similar materials, said roller press comprising two parallelly arranged rollers, roller being a fixed roller, roller being a movable roller, said rollers configured to rotate in opposite direction towards each other and separated by a gap, said fixed roller comprising an even load distributor assembly ELD, said ELD assembly comprising an outer ring and an inner ring, said inner ring being fixed on said fixed roller by a fastening means such as a screw, said inner ring and said outer ring being connected by means of one or more bank of spring plates, said bank of spring plates being fixed at an angle Θ varying from 0 degrees to 60 degrees, said outer ring comprising deflection sensing rings.

9 Claims, 9 Drawing Sheets

ARRANGEMENT FOR ENSURING EVEN PRESSURE DISTRIBUTION FOR HYDRAULIC ROLLER PRESS

FIELD OF THE INVENTION

The invention relates to a roller press for grinding of specific materials such as cement raw materials, cement clinker and similar materials.

BACKGROUND OF THE INVENTION

In cement and mineral industries, hydraulic roller press HRP is used to comminute the bigger solid particles into smaller particles by feeding the material input through the gap between the two parallel rollers which are rotating in opposite directions. The material is not only crushed by the two roller surfaces but also by the particles which are needing to be crushed, the method called interparticle crushing. ELD (Even Load Distributor) is an additional feature added to the HRP for utilizing the entire width of the roller for effective crushing of the material.

In the state of the art design of HRP, the ratio between roller diameter to roller width is very important because of a significant edge effect, i.e., the crushing effect is reduced at the edge of the rollers. This is due to the fact that the material escapes over the edges of the rollers thereby reducing the crushing pressure on the material towards the gap at the edges of the rollers. To solve this problem Even Load Distributor ELD is being used in HRP but following problems are observed Flat spring used in the existing prior art is not providing prestress and thereby the material escapes through the cheek plates.

High deflection leads to failure of spring

Curved spring has lesser fatigue life span

OBJECT OF THE INVENTION

It is an object of the present invention to overcome or at least alleviate one or more of the above problems of the prior art and/or provide the consumer with a useful or commercial choice.

It is an object of the present invention to provide a roller press for grinding of specific materials such as cement raw materials, cement clinker and similar materials.

It is another object of the present invention to provide an even load distributor assembly ELD.

It is a further object of the present invention to provide an alternative to the prior art.

SUMMARY OF THE INVENTION

In a first aspect, the invention relates to a roller press for grinding of specific materials such as cement raw materials, cement clinker and similar materials, said roller press comprising two parallelly arranged rollers, a fixed roller and a movable roller, said rollers configured to rotate in opposite direction towards each other and separated by a gap, said fixed roller comprising an even load distributor assembly ELD, said ELD assembly comprising an outer ring and an inner ring, said inner ring being fixed on said fixed roller by a fastening means such as a screw, said inner ring and said outer ring being connected by means of one or more bank of spring plates, said bank of spring plates being fixed at an angle Θ varying from 0 degrees to 60 degrees, said outer ring comprising deflection sensing rings.

By the features of the present invention even load distribution for crushing is achieved by using the co-rotating rings at both ends of the fixed roller, which are preferably mounted to the fixed roller by means of spring plate and one more fixed ring, which holds all the spring plates on it. The inner ring is preferably fixed on the fixed roller on each side of the fixed roller and the pre-stressing on the ELD ring is achieved by offset in planar surfaces allowing the springs to be deflected back when it is in operation ensuring material is not flowing through.

The prestress may be achieved by making the flat spring plates deflect in such a way that the spring action due to the material virtue will push and retain the feed material.

The resilient element may comprise multiple spring plates, preferably made of steel. It's a bank of spring plates added to reduce the deflection of the annular disc. The main advantage is that the number of bank of spring plates can be added during commissioning time or during the time of increase in production to decrease the deflection of the overall annular disc and increase the life of the spring plates. The stiffness is varied by varying the number of spring plates.

The resilient element bank of spring plates are not connected radially on the roller end surface. They are preferably tilted at an angle to the radial direction of the rollers. The advantage is to utilize the resiliency of the increased length of the spring plate in reducing the bending stress due to reducing the distance of action of force to the mounting location.

The deflection sensing ring may comprise an inner support ring and an outer support ring, the inner support ring being mounted on the outer ring by a fastening mechanism. The outer support ring is preferably being mounted on the inner support ring by a fastening mechanism.

The inner support ring may be mounted on the outer ring by a screw with a pin hole and nut and/or by a welded joint. The outer support ring may be mounted on the inner support ring by a screw with pin hole and nut and/or by a welded joint.

The inner ring is preferably assembled with the outer ring in such a way that it has a differential distance between a planer surfaces of the outer ring and the inner ring.

The differential distance has an influence on the pre-load exerted on the fixed roller. The preload caused by this differential distance will ensure that the roller press resists the axial forces created due to the grinding of the material in addition to the stiffness created by the bank of springs. This will also ensure that there is always material retained equal to the amount of axial force that it creates.

A plurality of spring plates, preferably ranging from 1 to 10, is arranged in the bank of spring plates so as to provide variable stiffness to the structure by changing the number of springs plates.

An even load distributor assembly ELD, according to the present invention, preferably comprises an outer ring and an inner ring. The inner ring may be fixed on the fixed roller by a screw. The inner ring and the outer ring is preferably being connected by means of one or more bank of spring plates. The bank of spring plates is preferably being fixed at an angle G varying from 0 degrees to 60 degrees. The outer ring may comprise deflection sensing rings.

In a second aspect the invention relates to a method for even load distributing material in a roller press for grinding of specific materials such as cement raw materials, cement clinker and similar materials. The method preferably utilizes an even load distributor according to the first aspect of the invention.

The first and second aspect of the invention may me combined.

BRIEF DESCRIPTION OF THE FIGURES

The figures show one way of implementing the present invention and is not to be construed as being limiting to other possible embodiments falling within the scope of the attached claim set, FIG. 1 schematically illustrates a roller press for grinding of specific materials according to the present invention, FIG. 2 schematically illustrates a roller press for grinding of specific materials according to the present invention from an alternative view.

DETAILED DESCRIPTION OF THE INVENTION

Figure 1:
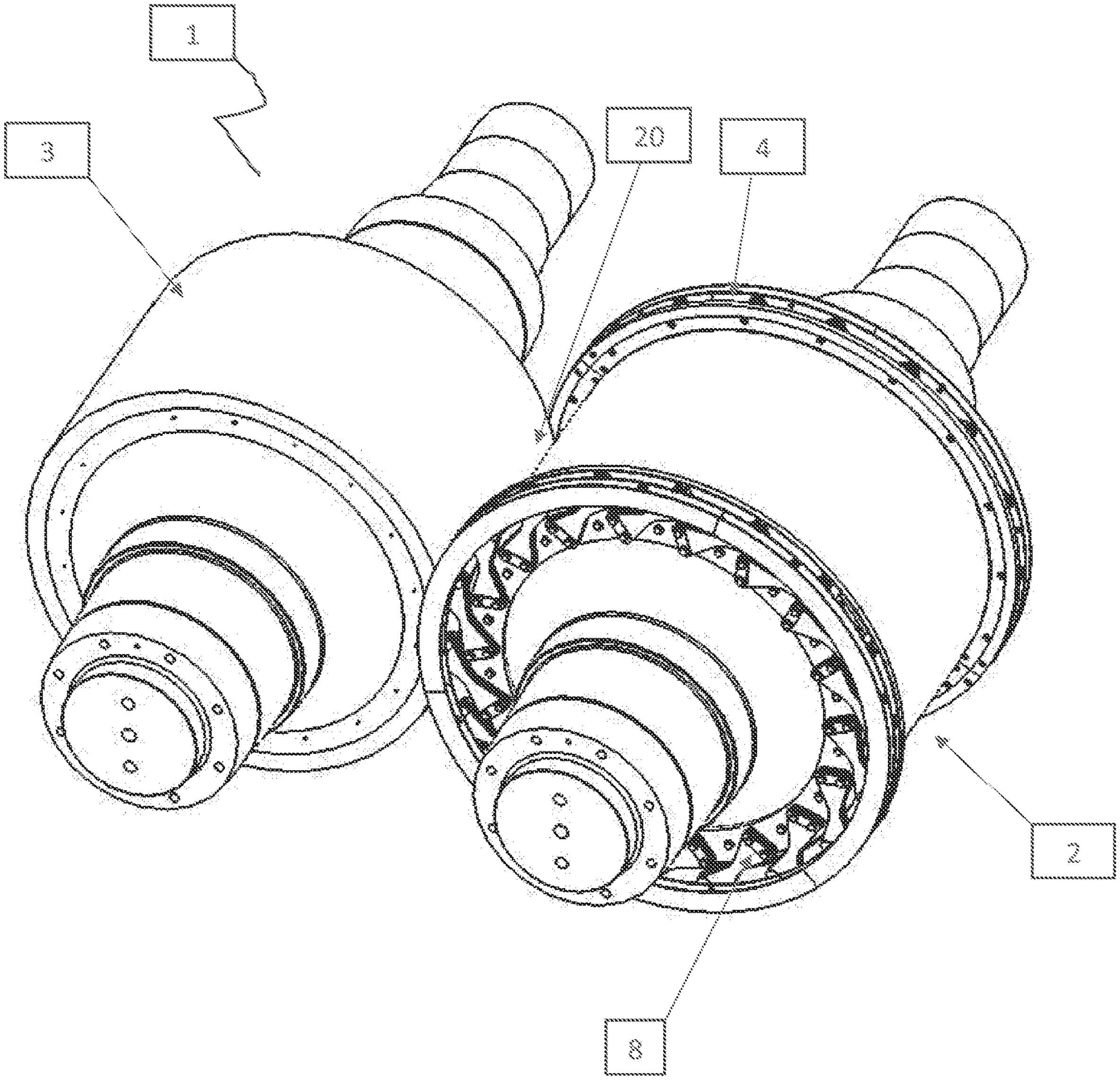

FIG. 1 schematically illustrates a preferred embodiment of the roller press for grinding of specific materials according to the present invention.

Figure 2:
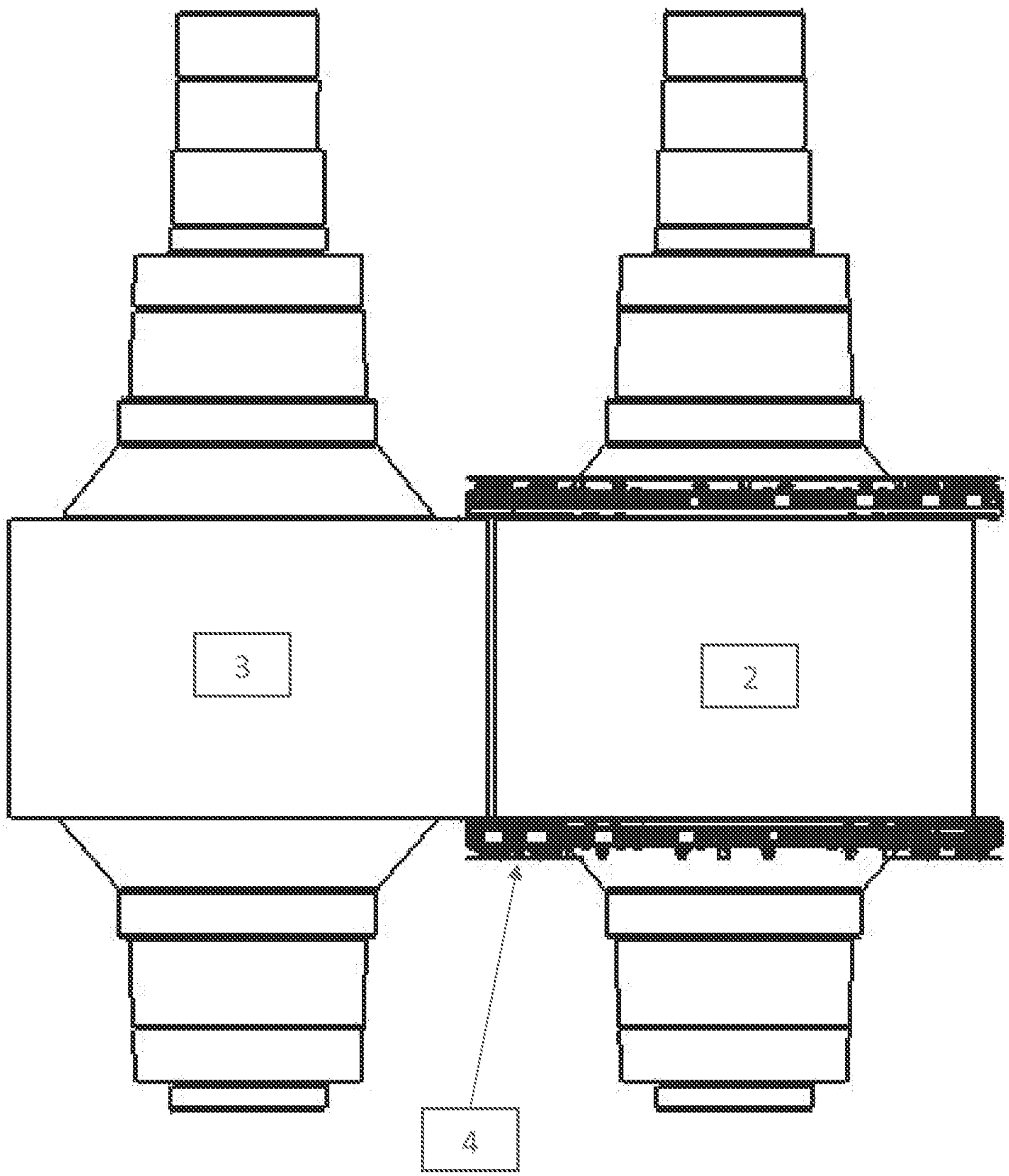
Figure 3:
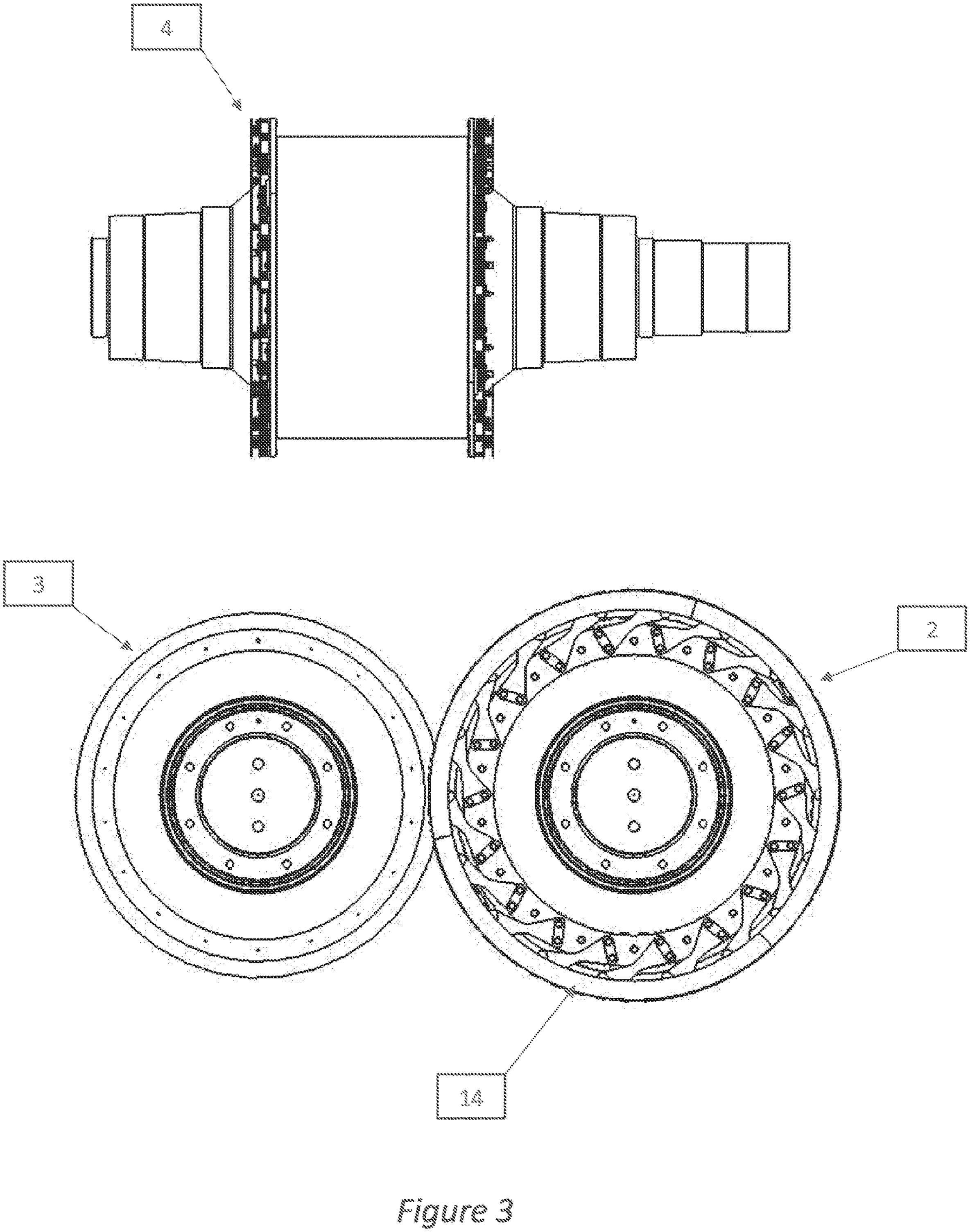
FIG. 3 schematically illustrates a roller press for grinding of specific materials according and an ELD assembly to the present invention.

In FIG. 2 and FIG. 3, the roller press for grinding of specific materials and an ELD assembly according to the present invention is schematically illustrated from an alternative view.

Figure 5:
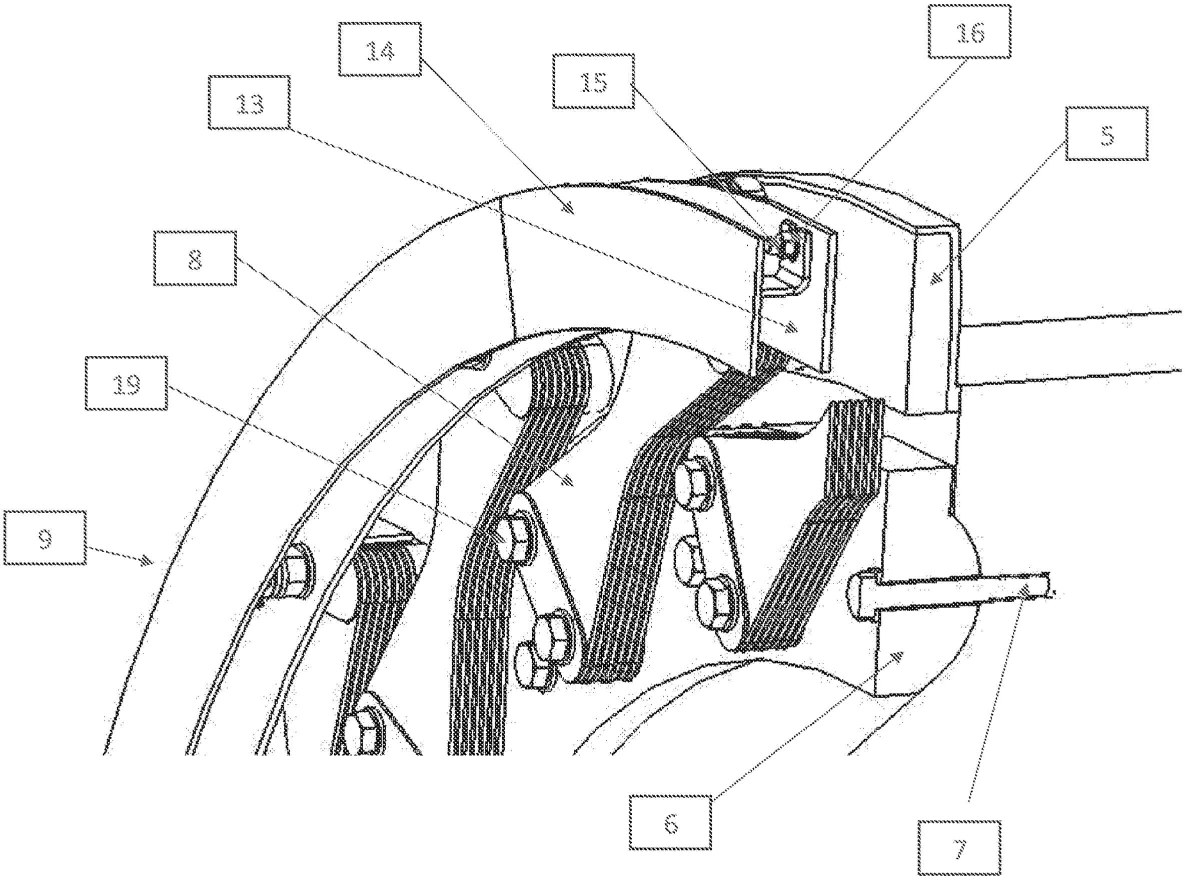
FIG. 5 schematically illustrates an ELD assembly according to the present invention.

On FIGS. 1-3 a roller press 1 for grinding of specific materials such as cement raw materials, cement clinker and similar materials is disclosed. The roller press 1 comprises two parallelly arranged rollers 2, 3; a fixed roller 2 and a movable roller 3. The rollers 2, 3 are configured to rotate in opposite direction towards each other and separated by a gap 20. The fixed roller 2 comprises an even load distributor assembly ELD 4. On FIG. 5 an embodiment of the ELD assembly according to present invention is disclosed. The ELD assembly 4 comprises an outer ring 5 and an inner ring 6. The inner ring 6 being fixed on the fixed roller 2 by a fastening means 7 such as a screw. The inner ring 6 and the outer ring 5 being connected by means of one or more bank of spring plates 8. The bank of spring plates 8 being fixed at an angle Θ varying from 0 degrees to 60 degrees. The outer ring 5 comprising deflection sensing rings 9, FIG. 5 schematically illustrates an ELD assembly according to the present invention. The sensing ring 9 comprises an inner support ring 13 and an outer support ring 14. The inner support ring 13 being mounted on the outer ring 5 by a fastening mechanism. The outer support ring 14 being mounted on the inner support ring 13 by a fastening mechanism, in a preferred embodiment of the present invention, the inner support ring 13 is mounted on the outer ring 5 by a screw with a pin hole 10 and nut 11 and/or by a welded joint. The outer support ring 14 is mounted on the inner support ring 13 by a screw with pin hole 15 and nut 16 and/or by a welded joint.

The inner ring 6 is assembled with the outer ring 5 in such a way that it has a differential distance H 17 between a planer surfaces of the outer ring 5 and the inner ring 6. The differential distance H 17 has an influence on pre-load exerted on the fixed roller 2, the preload caused by this differential distance will ensure that the system resists the axial forces created due to the grinding of the material in addition to the stiffness created by the bank of springs. This will also ensure that there is always material retained equal to the amount of axial force that it creates.

Figure 4:
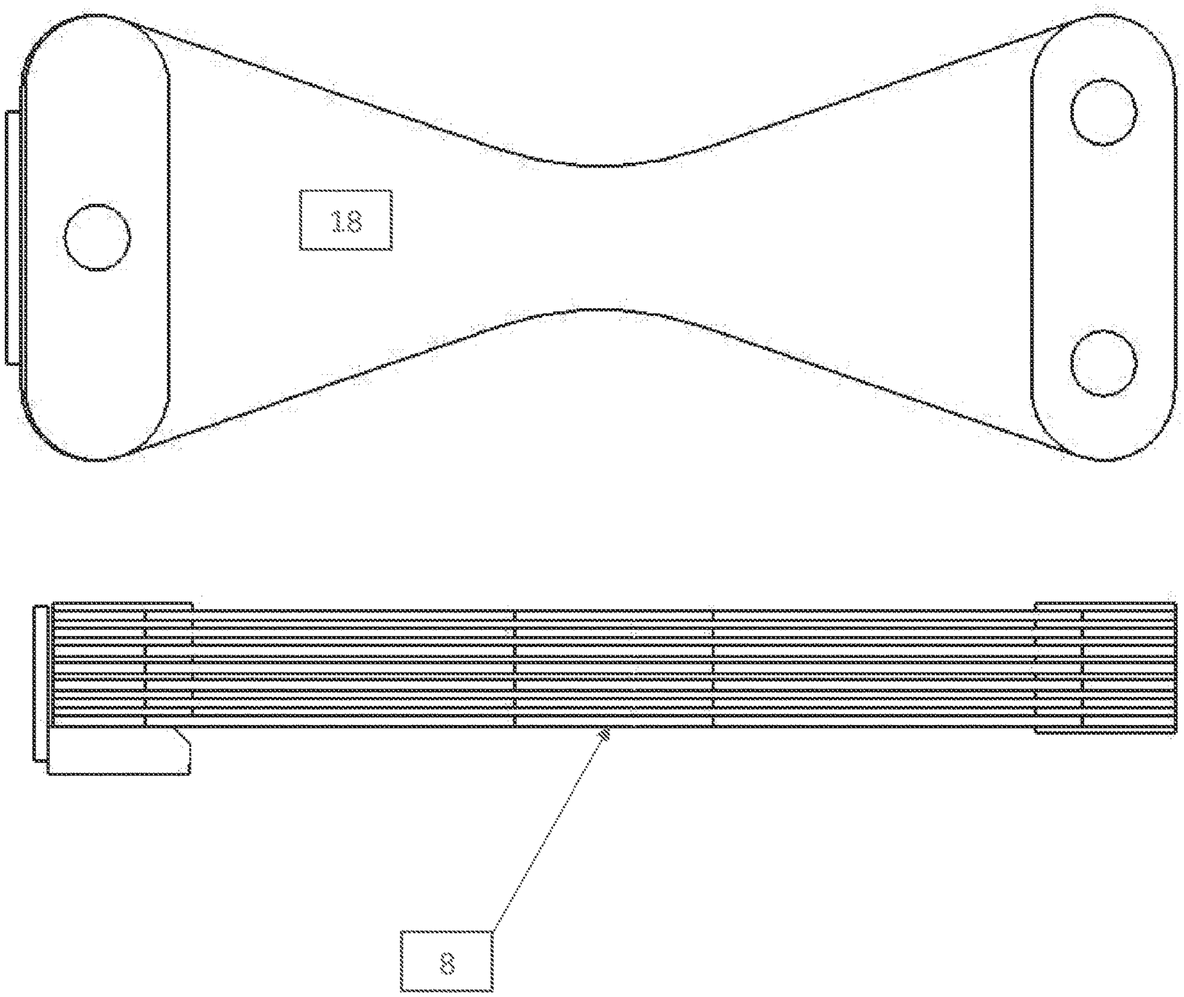
FIG. 4 schematically illustrates a bank of spring plates and a spring plate according to the present invention.

FIG. 4 schematically illustrates a bank of spring plates and a spring plate according to the present invention. A plurality of spring plates 18, ranging from 1 to 10, is arranged in the bank of spring plates 8 so as to provide variable stiffness to the structure by changing the number of springs plates 18.

Figure 6:
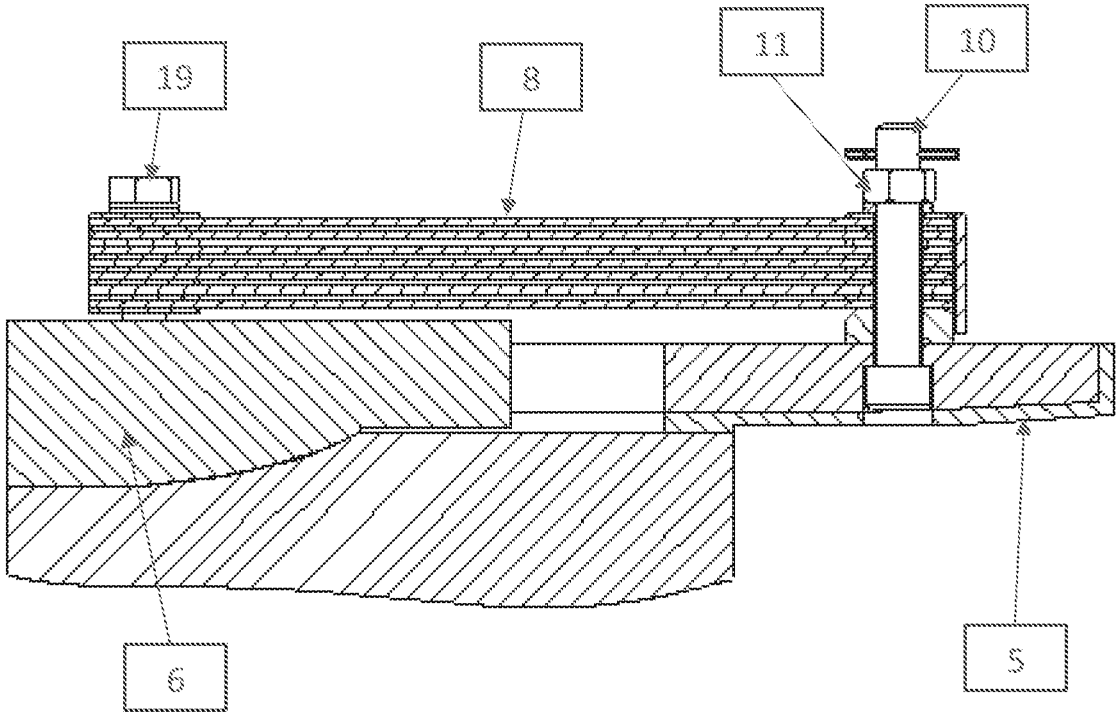
FIG. 6 schematically illustrates a bank of spring plates mounted on an ELD assembly according to the present invention.
Figure 7:
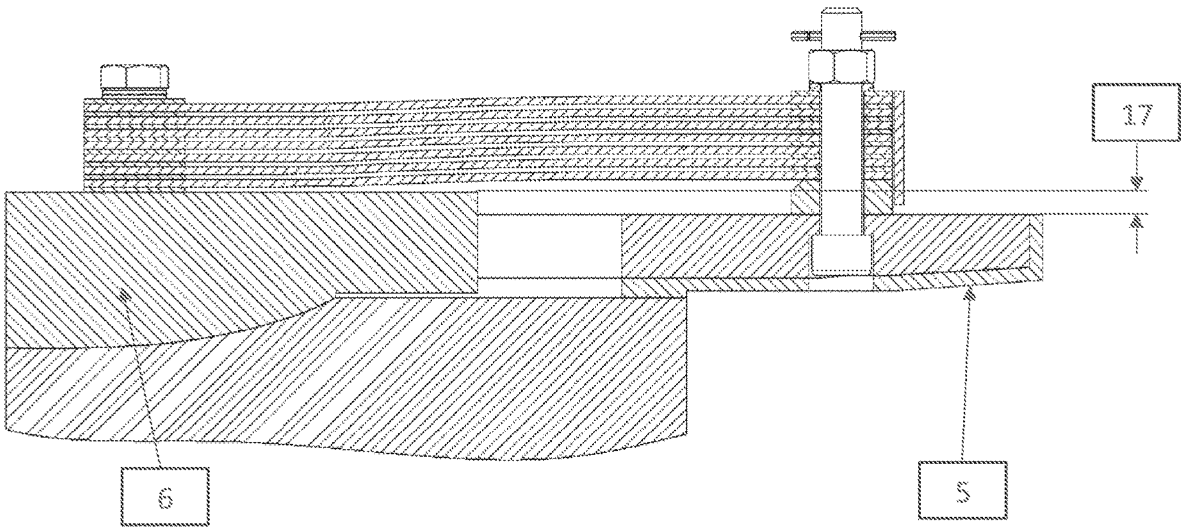
FIG. 7 schematically illustrates a bank of spring plates mounted on an ELD assembly according to the present invention.
Figure 8:
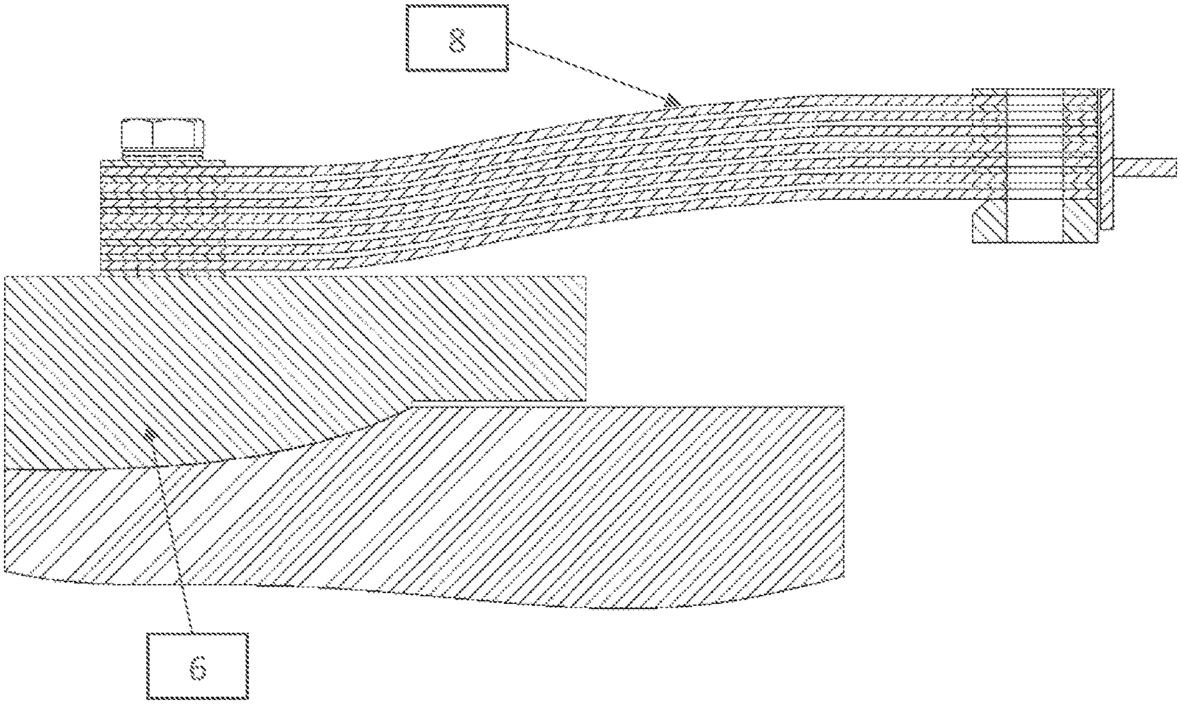
FIG. 8 schematically illustrates a bank of spring plates mounted on an inner ring of an ELD assembly according to the present invention.

FIGS. 6, 7 and 8 schematically illustrates how the bank of spring plate and the outer ring 5.

Figure 9:
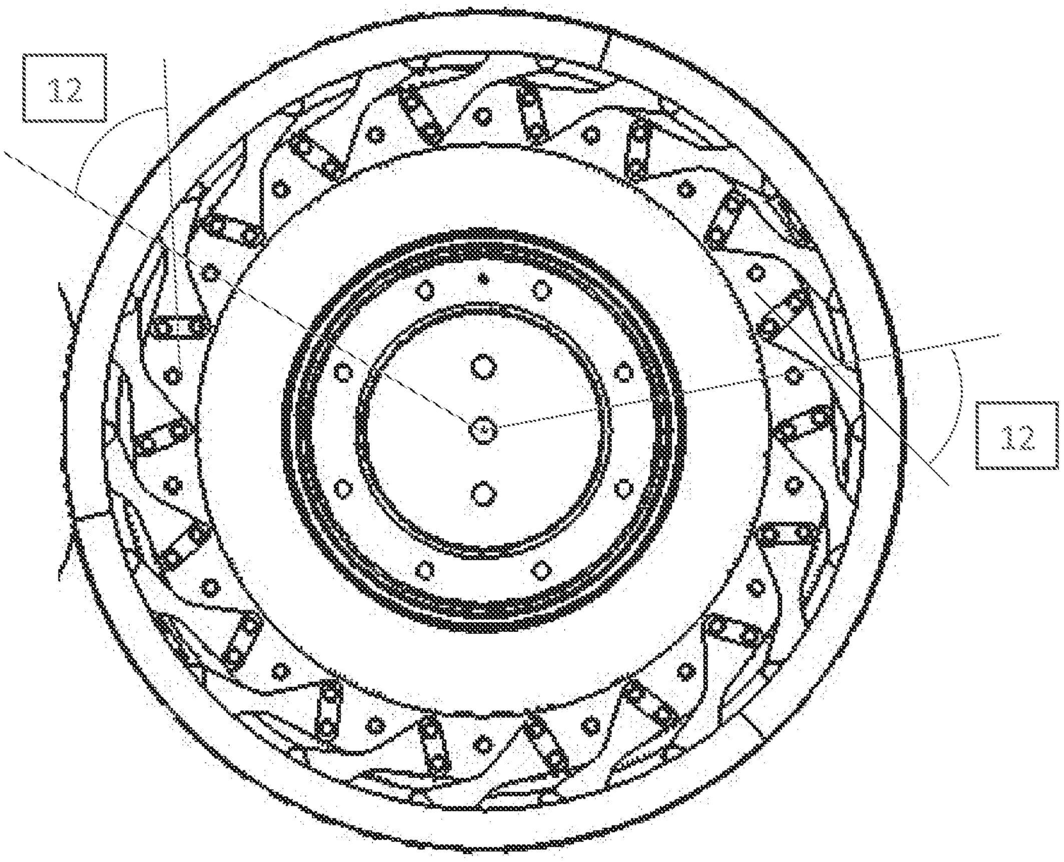
FIG. 9 schematically illustrates an ELD assembly according to the present invention.

FIG. 9 schematically illustrates how the angle Θ 12 is defined. The angle Θ12 is measured between the center line of the spring plate 18 and the line which connects the roller center point and center point of the spring plate 18.

In a preferred embodiment of the present invention, an even load distributor assembly ELD 4 comprises an outer ring 5 and an inner ring 6. The inner ring 6 is fixed on the fixed roller 2 by a screw 7. The inner ring 6 and the outer ring 5 is connected by means of one or more bank of spring plates 8. The bank of spring plates 8 being fixed at an angle Θ varying from 0 degrees to 60 degrees. The outer ring 5 comprises deflection sensing rings 9. FIG. 9 schematically illustrates the ELD assembly, disclosing the angle Θ 12.

The present invention also relates to a method for even load distributing material in a roller press 1 for grinding of specific materials such as cement raw materials, cement clinker and similar materials. The method utilizes an even load distributor according to any of the embodiments mentioned above.

Although the present invention has been described in connection with the specified embodiments, it should not be construed as being in any way limited to the presented examples. It should also be understood that the form of this invention as shown is merely a preferred embodiment. Various changes may be made in the function and arrangement of parts; equivalent means may be substituted for those illustrated and described; and certain features may be used independently from others without departing from the spirit and scope of the invention as defined in the following claims.

REFERENCES

1. Roller press
2. Fixed roller
3. Movable roller
4. ELD assembly
5. Outer ring
6. Inner ring
7. Screw (for fixed ring)
8. Bank of spring plates
9. Deflection sensing ring
10. Screw with pin hole
11. Nut
12. Θ—angle

13. Inner support ring
14. Outer support ring
15. Screw with pin hole
16. Nut
17. H—differential distance
18. Spring plate
19. Screw (for spring assembly)
20. Gap

The invention claimed is:

1. A roller press for grinding of specific materials such as cement raw materials, cement clinker and similar materials, said roller press comprising two parallelly arranged rollers, a fixed roller and a movable roller, said rollers configured to rotate in opposite direction towards each other and separated by a gap, said fixed roller comprising an even load distributor assembly (ELD), said ELD assembly (4) comprising an outer ring and an inner ring said inner ring being fixed on said fixed roller by a fastening means, said inner ring and said outer ring being connected by means of one or more bank of spring plates, said bank of spring plates being fixed at an angle varying from 0 degrees to 60 degrees, said outer ring comprising deflection sensing rings.

2. The roller press according to claim 1, wherein the deflection sensing ring comprises an inner support ring and an outer support ring, said inner support ring being mounted on said outer ring by a fastening mechanism, said outer support ring being mounted on said inner support ring by a fastening mechanism.

3. The roller press according to claim 2, wherein the inner support ring being mounted on said outer ring by a screw with a pin hole and nut and/or by a welded joint, said outer support ring being mounted on the said inner support ring by a screw with pin hole and nut and/or by a welded joint.

4. The roller press according to claim 1, wherein the inner ring is assembled with said outer ring in such a way that it has a differential distance H between a planer surfaces of said outer ring and said inner ring.

5. The roller press according to claim 4, wherein said differential distance H has an influence on a pre-load exerted on said fixed roller, said preload caused by said differential distance will ensure that the roller press resists axial forces created due to the grinding of the material in addition to the stiffness created by the bank of spring plates.

6. The roller press according to claim 1, wherein a plurality of spring plates ranging from 1 to 10 is arranged in said bank of spring plates so as to provide variable stiffness to the structure by changing the number of springs plates.

7. An even load distributor (ELD) assembly, said ELD assembly comprising an outer ring and an inner ring, said inner ring being fixed on a fixed roller by a screw, said inner ring and said outer ring being connected by means of one or more bank of spring plates, said bank of spring plates being fixed at an angle varying from 0 degrees to 60 degrees, said outer ring comprising deflection sensing rings.

8. A method for even load distributing material in a roller press for grinding materials, the method comprising:

- providing an even load distributor assembly, the ELD assembly having:
  - an outer ring and an inner ring, said inner ring being fixed on a fixed roller by a fastener, said inner ring and said outer ring being connected by means of one or more bank of spring plates, said bank of spring plates being fixed at an angle varying from 0 degrees to 60 degrees, said outer ring comprising deflection sensing rings; and
- utilizing the ELD assembly for even load distribution during grinding of material provided via the roller press.

9. The method of claim 8, wherein the fastener is a screw.

* * * * *